(12) United States Patent
Spielberg (10) Patent No.: US 8,830,380 B2
(45) Date of Patent: Sep. 9, 2014

(54) DEPTH OF FOCUS IN DIGITAL IMAGING SYSTEMS

(75) Inventor: Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 138 days.

(21) Appl. No.: 13/536,157

(22) Filed: Jun. 28, 2012

(65) Prior Publication Data

US 2014/0002712 A1 Jan. 2, 2014

(51) Int. Cl.
*H04N 5/232* (2006.01)
*G03B 13/00* (2006.01)

(52) U.S. Cl.
USPC .......................................... 348/348; 348/345

(58) Field of Classification Search
USPC .................. 348/335, 340, 345, 348
See application file for complete search history.

(56) References Cited

U.S. PATENT DOCUMENTS

| | | | |
|---|---|---|---|
| 6,201,899 B1 | 3/2001 | Bergen | 382/284 |
| 6,320,979 B1 | 11/2001 | Melen | 382/154 |
| 7,565,074 B2 * | 7/2009 | Nakahara | 396/125 |
| 2008/0013941 A1 * | 1/2008 | Daley | 396/121 |
| 2009/0225199 A1 | 9/2009 | Ferren | 348/240.99 |
| 2010/0128137 A1 | 5/2010 | Guidash | 348/222.1 |
| 2010/0277793 A1 | 11/2010 | Hauger et al. | 359/381 |
| 2010/0283868 A1 | 11/2010 | Clark et al. | 348/231.4 |
| 2013/0010137 A1 * | 1/2013 | Kawai | 348/208.1 |
| 2013/0141538 A1 * | 6/2013 | DaneshPanah et al. | 348/46 |
| 2013/0141615 A1 * | 6/2013 | Li et al. | 348/239 |
| 2013/0176458 A1 * | 7/2013 | Van Dalen et al. | 348/231.99 |
| 2013/0321690 A1 * | 12/2013 | Krishnaswamy et al. | 348/345 |

* cited by examiner

*Primary Examiner* — Kelly L Jerabek
(74) *Attorney, Agent, or Firm* — VanLeeuwen & VanLeeuwen; Steven L. Bennett (57) ABSTRACT

An approach is provided to generate a composite image of a moving object by using image stacking on a set of captured digital images of the moving subject. A composition depth-of-field of the moving subject is identified. A digital camera with a focus distance setting and an auto-focus system is used to capture the set of digital images with each of the digital images are at a different focus distance within the composition depth-of focus. Each of the digital images is focused using the digital camera's auto-focus system. The captured digital images are stored in a memory and the composite image is generated from the stored images by using an image stacking process on the set of images.

24 Claims, 4 Drawing Sheets

DEPTH OF FOCUS IN DIGITAL IMAGING SYSTEMS

TECHNICAL FIELD

The present disclosure relates to an approach that increases depth of field in digital images of moving subjects.

BACKGROUND OF THE INVENTION

In characterizing an image, "depth of field" (DOF) refers to the near/far zone of subject distance (i.e., distance between the subject and the imaging sensor) in which the subject appears in sharp focus. In a large (or "deep") DOF, the zone of sharp focus extends from the nearest subject area to the most distant subject area. In contrast, in a small (or "shallow") DOF, the zone of sharp focus covers only a small portion of the entire image. DOF is determined by the physical properties of the imaging system, including the imaging sensor and the lens in use. When all other parameters are held constant, a smaller lens aperture will generally yield a greater DOF than a larger lens aperture. In many photographic situations, a relatively large DOF is desired (e.g., to ensure all the faces in a group of people are captured in sharp focus), however the use of an appropriately small aperture (to achieve the desired DOF) is often difficult or impossible. This is because a smaller lens aperture admits less light than the larger lens aperture. In situations where the light for exposure is constrained (e.g., shooting by available light indoors) the use of a large aperture is often desired in order to make a proper exposure, and the resulting loss of DOF is an unavoidable consequence with traditional systems.

SUMMARY

An approach is provided to generate a composite image of a moving object by using image stacking on a set of captured digital images of the moving subject. A composition depth-of-field of the moving subject is identified. A digital camera with a focus distance setting and an auto-focus system is used to capture the set of digital images with each of the digital images are at a different focus distance within the composition depth-of field. Each of the digital images is focused using the digital camera's auto-focus system. The captured digital images are stored in a memory and the composite image is generated from the stored images by using an image stacking process on the set of images.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The following detailed description will generally follow the summary of the disclosure, as set forth above, further explaining and expanding the definitions of the various aspects and embodiments of the disclosure as necessary.

Figure 1:
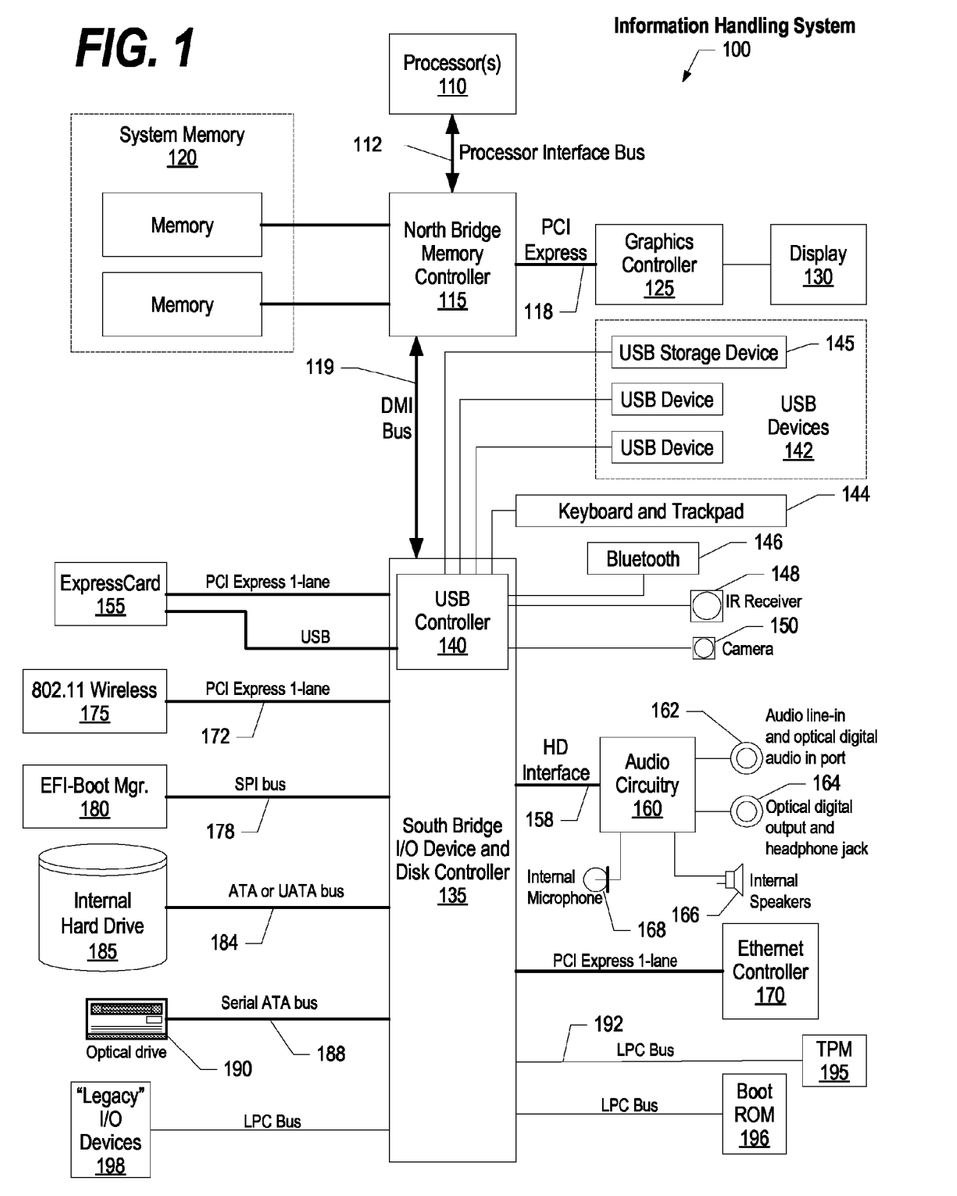
FIG. 1 is a block diagram of a data processing system in which the methods described herein can be implemented.

FIG. 1 illustrates information handling system 100, which is a simplified example of a computer system capable of performing the computing operations described herein. Information handling system 100 includes one or more processors 110 coupled to processor interface bus 112. Processor interface bus 112 connects processors 110 to Northbridge 115, which is also known as the Memory Controller Hub (MCH). Northbridge 115 connects to system memory 120 and provides a means for processor(s) 110 to access the system memory. Graphics controller 125 also connects to Northbridge 115. In one embodiment, PCI Express bus 118 connects Northbridge 115 to graphics controller 125. Graphics controller 125 connects to display device 130, such as a computer monitor.

Northbridge 115 and Southbridge 135 connect to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus connects the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 196 and "legacy" I/O devices (using a "super I/O" chip). The "legacy" I/O devices (198) can include, for example, serial and parallel ports, keyboard, mouse, and/or a floppy disk controller. The LPC bus also connects Southbridge 135 to Trusted Platform Module (TPM) 195. Other components often included in Southbridge 135 include a Direct Memory Access (DMA) controller, a Programmable Interrupt Controller (PIC), and a storage device controller, which connects Southbridge 135 to nonvolatile storage device 185, such as a hard disk drive, using bus 184.

ExpressCard 155 is a slot that connects hot-pluggable devices to the information handling system. ExpressCard 155 supports both PCI Express and USB connectivity as it connects to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, keyboard and trackpad 144, and Bluetooth device 146, which provides for wireless personal area networks (PANs). USB Controller 140 also provides USB connectivity to other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etcetera.

Wireless Local Area Network (LAN) device 175 connects to Southbridge 135 via the PCI or PCI Express bus 172. LAN device 175 typically implements one of the IEEE 0.802.11 standards of over-the-air modulation techniques that all use the same protocol to wireless communicate between information handling system 100 and another computer system or device. Optical storage device 190 connects to Southbridge 135 using Serial ATA (SATA) bus 188. Serial ATA adapters and devices communicate over a high-speed serial link. The Serial ATA bus also connects Southbridge 135 to other forms of storage devices, such as hard disk drives. Audio circuitry 160, such as a sound card, connects to Southbridge 135 via bus 158. Audio circuitry 160 also provides functionality such as audio line-in and optical digital audio in port 162, optical digital output and headphone jack 164, internal speakers 166, and internal microphone 168. Ethernet controller 170 connects to Southbridge 135 using a bus, such as the PCI or PCI Express bus. Ethernet controller 170 connects information handling system 100 to a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a hand-held or stationary camera, or a digital single-lens reflex camera (dSLR).

Figure 2:
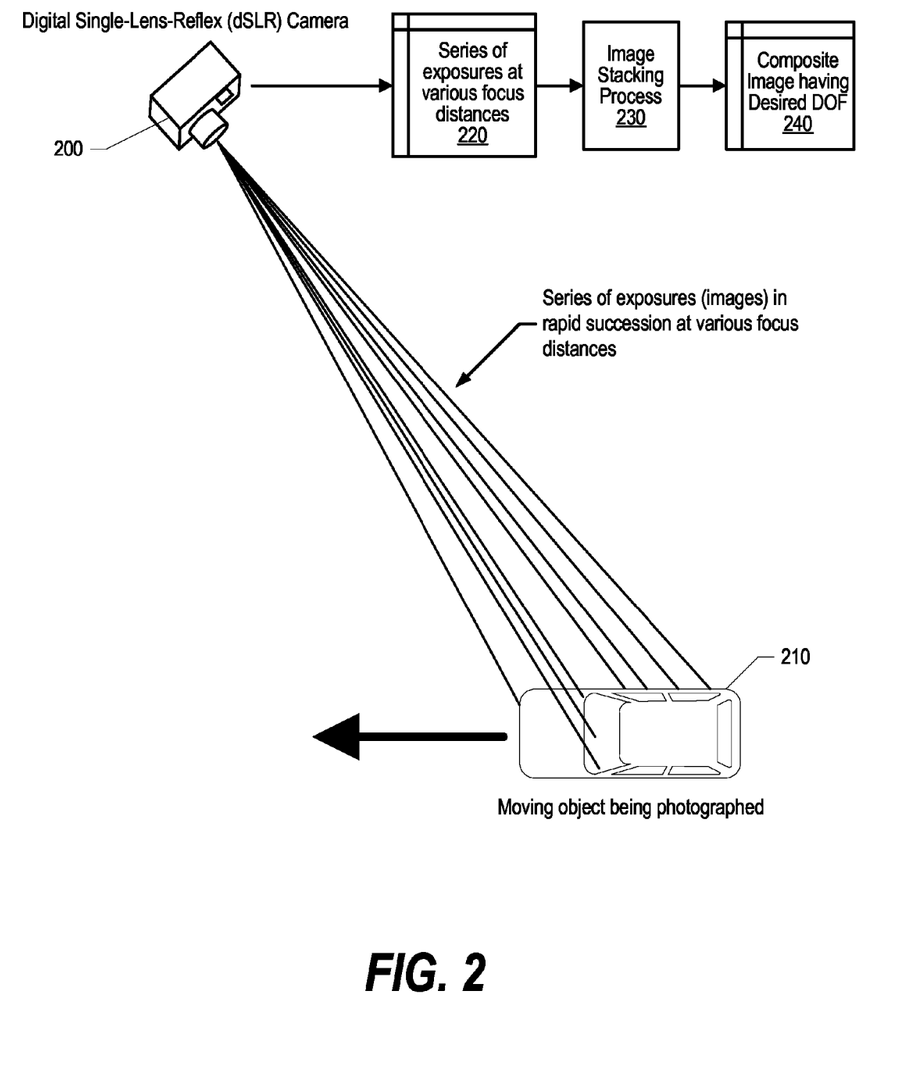
FIG. 2 is a diagram of a camera capturing images of a moving subject in a manner that achieves a greater depth of field (DOF) in a composite image.

FIG. 2 is a diagram of a camera capturing images of a moving subject in a manner that achieves a greater depth of field (DOF) in a composite image. Digital camera 200, such as a digital single-lens reflex camera, includes a focus distance setting and is equipped with an auto-focus system. As known by those skilled in the art, an auto-focus (or AF) optical system uses a sensor, a control system and a motor to automatically focus on a selected point or area. The focus distance setting is set by the process described herein on a moving object and the auto-focus system focuses on the object using the focus distance setting. In other words, the focus distance setting is an input to the auto-focus system via the process described herein and the auto-focus refrains from altering or changing the focus distance setting that it receives.

As shown, digital camera 200 takes a series of digital images (exposures) of the moving subject (e.g., moving automobile 210, etc.) in a rapid succession (all digital images captured within a few seconds period of time (e.g., within a five second period of time, etc.). Each of the digital images is captured using a different focus distance setting in the digital camera with the auto-focus system focusing the digital camera on the moving subject for each digital image. The set of digital images that were taken of the moving subject using different focus distances for each digital image are stored in memory 220 (e.g., a memory within digital camera 200). A traditional image stacking process (process 230) is then used to process the series of digital images stored in memory 220 and create composite image 240 of the moving subject with composite image 240 having the depth-of-field desired by the user.

Figure 3:
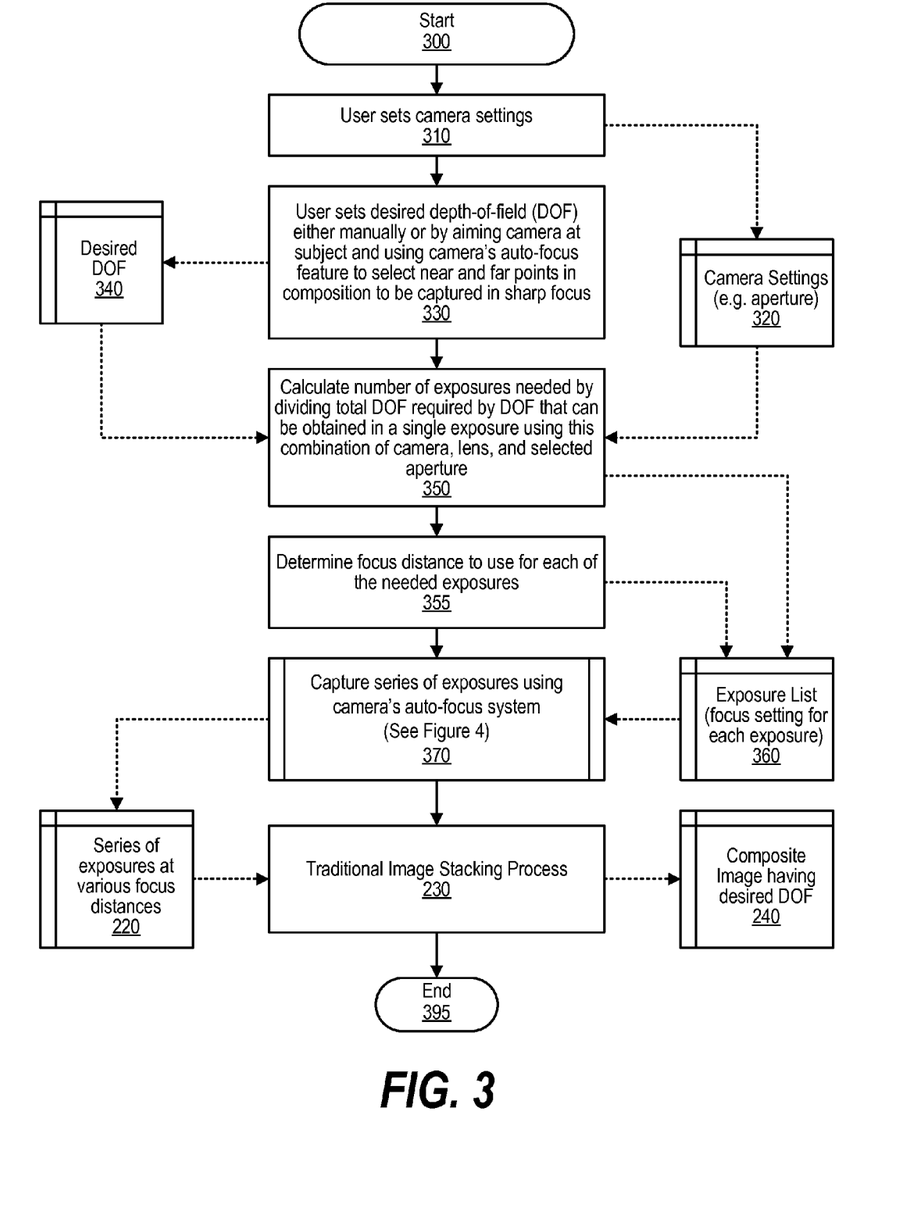
FIG. 3 is a flowchart showing steps performed to generate the composite image of the moving subject with a greater depth of field (DOF)

FIG. 3 is a flowchart showing steps performed to generate the composite image of the moving subject with a greater depth-of-field (DOF). Processing commences at 300 whereupon, at step 310, the user (e.g., the photographer, etc.), sets various camera settings (e.g., camera shutter speed, aperture setting, film speed, etc.). At step 330, the user sets the desired depth-of-field (DOF) either manually or by aiming camera at a subject and using camera's auto-focus feature to select near and far points in composition to be captured in sharp focus. The desired DOF setting for the composite image of the moving subject is stored in memory area 340.

At step 350, the system automatically calculate the number of digital images (exposures) that will be needed by dividing the total composite DOF stored in memory area 340 by the DOF that can be obtained in a single exposure using this combination of camera, lens, and selected aperture set by the user in step 310. The number of digital images that are needed is stored in memory area 360. At step 355, the process determines a different focus distance that will be for each of the digital images that will be taken. For example, if ten total digital images were calculated in step 350 and the near focus distance of the moving is 100 feet and the far focus distance is 109 feet, then each of the focus distance will be increased by one foot for each digital image taken (e.g., first digital image uses 100 feet as the focal distance, second digital image uses 101 feet as the focal distance, and so on until the last (tenth) digital image uses 109 feet as the focal distance). Other focus distances can be used to provide the desired depth-of-field and the digital images do not have to be captured in order of increasing focus distance. The focus distances can be mixed up in any order. The exposure list (list of digital images that will be taken) is stored in memory area 360 with the list providing a list of the different focus distances needed for each digital image that is about to be captured.

Figure 4:
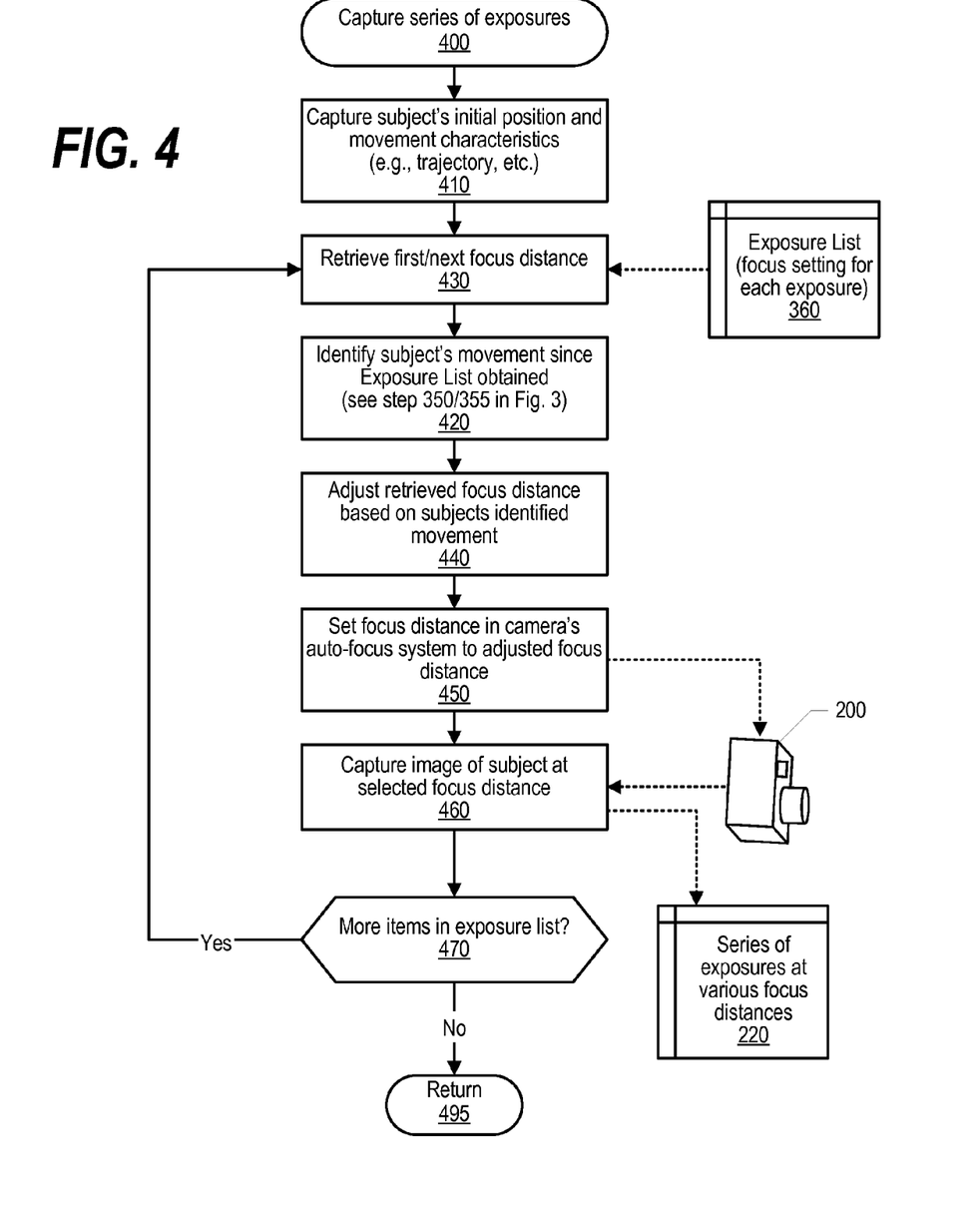
FIG. 4 is a flowchart showing steps performed capture a series of exposures of the moving subject that are used to create the composite image.

At predefined process 370, the system captures a series of digital images (exposures) by setting the different focus distances listed in memory area 360 and using the digital camera's auto-focus system to capture the digital images of the moving subject (see FIG. 4 and corresponding text for processing details). After the series of digital images have been captured of the moving subject using different focus distance settings for each of the captured image, a traditional image stacking process (process 230) is utilized. Process 230 combines, or "stacks," the series of digital images taken by the digital camera using different focus distances and stored in memory area 220. The result of image stacking process 230 is composite image 240 of the moving subject with the composite image having the depth-of-field desired by the user. Processing thereafter ends at 395.

FIG. 4 is a flowchart showing steps performed to capture a series of exposures of the moving subject that are used to create the composite image. Processing used to capture the series of digital images commences at 400. At step 410, the process captures the moving subject's initial position and movement characteristics, such as the object's velocity, etc.

At step 420, the first focus distance is retrieved from the exposure list that details the various focus distances that are to be used for each of the digital images being taken of the moving subject.

At step 430, the process prepares to take the first exposure (digital image) of the moving subject by identifying the subject's movement that has occurred since the exposure list was taken and stored in memory area 360 (see steps 350 and 355 in FIG. 3 for details regarding the creation of the exposure list).

At step 440, the process adjusts the focus distance retrieved at step 430 based on the subject's movement since the exposure list was taken. For example, a fast moving automobile may have moved several feet towards or away from the digital camera since the time that the exposure list was created. Using the example provided in FIG. 3 where ten digital images are to be taken using focus distances ranging from 100 feet to 109 feet, if the automobile has moved five feet away from the user, then the focus distance is adjusted by five feet to use adjusted focus distances ranging from 105 feet to 114 feet. In one embodiment, the identification of the subjects movement is made for each exposure (digital image) captured. So, for example, if the automobile has moved another five feet away from the user when the last exposure is taken, that focus distance is adjusted by another five feet.

At step 450, the focus distance in the digital camera is set to the adjusted focus distance that was calculated in step 440. The focus distance that is set is used by the camera's auto-focus system to automatically focus at the set focus distance. At step 460, the digital camera captures a digital image of the moving subject using the selected focus distance. The digital image is stored in memory area 220.

A decision is made as to whether there are more exposures (digital images) listed in exposure list 360 that need to be captured (decision 470). If there are additional digital images to capture, then decision 360 branches to the "yes" branch which loops back to retrieve the next focus distance, adjust the retrieved focus distance based on the subject's movement, set the focus distance in the camera, and capture the next digital image, storing it with the other captured digital images in memory area 220. This looping continues until all of the digital images listed in the exposure list have been captured, at which point decision 470 branches to the "no" branch and processing returns to the calling routine (see FIG. 3) at 495. The looping through all of the exposures listed in the exposure list takes place in rapid succession. In one embodiment, all of the digital images are captured within a five second window from the time that the first image is captured to the time that the last image is captured.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive). Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system comprising:
   identifying a composition depth-of-field of a moving subject;
   identifying a plurality of focus distance settings, each focus distance setting corresponding to one of a plurality of digital images;
   identifying a first movement of the moving subject, the first movement being the movement of the moving subject since the focus distance settings were identified;
   retrieving an initial focus distance corresponding to a first of the plurality of digital images;
   adjusting the initial focus distance based on the identified first movement;
   setting the focus distance in a digital camera's auto-focus system to the adjusted initial focus distance;
   capturing, using the digital camera, the plurality of digital images of the moving subject, wherein each of the digital images are at a different focus distance within the composition depth-of focus, and wherein each of the digital images is focused using the digital camera's auto-focus feature; and
   storing the captured digital images in a memory.

2. The method of claim 1 further comprising:
   receiving the composition depth-of-field from a user; and
   calculating a total number of digital images in the plurality of digital images by dividing the composition depth-of-field by a single depth-of-field that can be achieved in a single digital image.

3. The method of claim 2 further comprising:
   identifying the focus distance setting corresponding to each of the total number of digital images prior to the capturing of the digital images.

4. The method of claim 3 further comprising:
   identifying the moving subject's initial position and movement characteristics.

5. The method of claim 4 further comprising:
   retrieving a second focus distance corresponding to a second of the plurality of digital images;
   identifying a second movement of the moving subject, the second movement being the movement of the moving subject since the focus distance settings were identified;
   adjusting the second focus distance based on the identified second movement; and
   setting the focus distance in the digital camera's auto-focus system to the adjusted second focus distance before capturing a second digital image of the plurality of digital images.

6. The method of claim 5 wherein the capturing of the plurality of digital images takes less than five seconds, and wherein the method further comprises:
   retrieving each subsequent focus distance corresponding to a subsequent of the plurality of digital images;
   identifying a subsequent movement of the moving subject, the subsequent movement being the movement of the moving subject since the focus distance settings were identified;
   adjusting the subsequent focus distance based on the identified subsequent movement; and
   setting the focus distance in the digital camera's auto-focus system to the adjusted subsequent focus distance before capturing a second digital image of the plurality of digital images.

7. The method of claim 1 further comprising:
   generating a composite image by image stacking the stored digital images.

8. The method of claim 7 wherein the generating is performed by a process within the digital camera, and wherein the generated composite image is stored on a memory included in the digital camera.

9. An information handling system included in a digital camera that includes a focus distance setting and an auto-focus system, wherein the information handling system further comprises:
   one or more processors;
   a memory coupled to at least one of the processors;
   a set of instructions stored in the memory and executed by at least one of the processors, wherein the set of instructions perform actions comprising:
      identifying a composition depth-of-field of a moving subject;
      identifying a plurality of focus distance settings, each focus distance setting corresponding to one of a plurality of digital images;
      identifying a first movement of the moving subject, the first movement being the movement of the moving subject since the focus distance settings were identified;
      retrieving an initial focus distance corresponding to a first of the plurality of digital images;
      adjusting the initial focus distance based on the identified first movement;
      setting the focus distance in the digital camera's auto-focus system to the adjusted initial focus distance;
      capturing, using the digital camera, the plurality of digital images of the moving subject, wherein each of the digital images are at a different focus distance within the composition depth-of focus, and wherein each of the digital images is focused using the digital camera's auto-focus feature; and
      storing the captured digital images in the memory.

10. The information handling system of claim 9 wherein the set of instructions perform further actions comprising:
    receiving the composition depth-of-field from a user; and
    calculating a total number of digital images in the plurality of digital images by dividing the composition depth-of-field by a single depth-of-field that can be achieved in a single digital image.

11. The information handling system of claim 10 wherein the set of instructions perform further actions comprising:
    identifying the focus distance setting corresponding to each of the total number of digital images prior to the capturing of the digital images.

12. The information handling system of claim 11 wherein the set of instructions perform further actions comprising:
    identifying the moving subject's initial position and movement characteristics.

13. The information handling system of claim 12 wherein the set of instructions perform further actions comprising:
    retrieving a second focus distance corresponding to a second of the plurality of digital images;
    identifying a second movement of the moving subject, the second movement being the movement of the moving subject since the focus distance settings were identified;
    adjusting the second focus distance based on the identified second movement; and
    setting the focus distance in the digital camera's auto-focus system to the adjusted second focus distance before capturing a second digital image of the plurality of digital images.

14. The information handling system of claim 13 wherein the capturing of the plurality of digital images takes less than five seconds, and wherein the set of instructions perform further actions comprising:
    retrieving each subsequent focus distance corresponding to a subsequent of the plurality of digital images;
    identifying a subsequent movement of the moving subject, the subsequent movement being the movement of the moving subject since the focus distance settings were identified;
    adjusting the subsequent focus distance based on the identified subsequent movement; and
    setting the focus distance in the digital camera's auto-focus system to the adjusted subsequent focus distance before capturing a second digital image of the plurality of digital images.

15. The information handling system of claim 9 wherein the set of instructions perform further actions comprising:
    generating a composite image by image stacking the stored digital images.

16. The information handling system of claim 15 wherein the generating is performed by a process within the digital camera, and wherein the generated composite image is stored on a memory included in the digital camera.

17. A computer program product stored in a computer readable storage device, comprising computer instructions that, when executed by an information handling system, causes the information handling system to perform actions comprising:
    identifying a composition depth-of-field of a moving subject;
    identifying a plurality of focus distance settings, each focus distance setting corresponding to one of a plurality of digital images;
    identifying a first movement of the moving subject, the first movement being the movement of the moving subject since the focus distance settings were identified;
    retrieving an initial focus distance corresponding to a first of the plurality of digital images;
    adjusting the initial focus distance based on the identified first movement;
    setting the focus distance in a digital camera's auto-focus system to the adjusted initial focus distance;
    capturing, using digital camera, the plurality of digital images of the moving subject, wherein each of the digital images are at a different focus distance within the composition depth-of focus, and wherein each of the digital images is focused using the digital camera's auto-focus feature; and
    storing the captured digital images in a memory.

18. The computer program product of claim 17 wherein the actions further comprise:
    receiving the composition depth-of-field from a user; and
    calculating a total number of digital images in the plurality of digital images by dividing the composition depth-of-field by a single depth-of-field that can be achieved in a single digital image.

19. The computer program product of claim 18 wherein the actions further comprise:
    identifying the focus distance setting corresponding to each of the total number of digital images prior to the capturing of the digital images.

20. The computer program product of claim 19 wherein the actions further comprise:
    identifying the moving subject's initial position and movement characteristics.

21. The computer program product of claim 20 wherein the actions further comprise:
  retrieving a second focus distance corresponding to a second of the plurality of digital images;
  identifying a second movement of the moving subject, the second movement being the movement of the moving subject since the focus distance settings were identified;
  adjusting the second focus distance based on the identified second movement; and
  setting the focus distance in the digital camera's auto-focus system to the adjusted second focus distance before capturing a second digital image of the plurality of digital images.

22. The computer program product of claim 21 wherein the capturing of the plurality of digital images takes less than five seconds, and wherein the computer program product further comprises:
  retrieving each subsequent focus distance corresponding to a subsequent of the plurality of digital images;
  identifying a subsequent movement of the moving subject, the subsequent movement being the movement of the moving subject since the focus distance settings were identified;
  adjusting the subsequent focus distance based on the identified subsequent movement; and
  setting the focus distance in the digital camera's auto-focus system to the adjusted subsequent focus distance before capturing a second digital image of the plurality of digital images.

23. The computer program product of claim 17 wherein the actions further comprise:
  generating a composite image by image stacking the stored digital images.

24. The computer program product of claim 23 wherein the generating is performed by a process within the digital camera, and wherein the generated composite image is stored on a memory included in the digital camera.

* * * * *